METHOD OF REFINING COPPER

Original Filed March 23, 1966 3 Sheets-Sheet 1

INVENTORS
Albert W. Spitz
Milton I. Schwab
BY Karl L. Spivak
ATTORNEY

METHOD OF REFINING COPPER

Original Filed March 23, 1966 3 Sheets-Sheet 2

INVENTORS
Albert W. Spitz
Milton I. Schwab
BY Karl L. Spivak
ATTORNEY

METHOD OF REFINING COPPER

Original Filed March 23, 1966 3 Sheets-Sheet 3

INVENTORS.
ALBERT W. SPITZ
MILTON I. SCHWAB
BY Karl L. Spivak
ATTORNEY.

United States Patent Office

Re. 27,548
Reissued Jan. 16, 1973

27,548

METHOD OF REFINING COPPER

Albert W. Spitz, Wyncote, and Milton I. Schwab, Philadelphia, Pa., assignors to Trio Process Corporation, Philadelphia, Pa.

Original No. 3,432,289, dated Mar. 11, 1969, Ser. No. 541,448, Mar. 23, 1966. Application for reissue Feb. 19, 1971, Ser. No. 116,898
Int. Cl. C22b *15/06, 15/14*
U.S. Cl. 75—73 27 Claims

Matter enclosed in heavy brackets [ ] appears in the original patent but forms no part of this reissue specification; matter printed in italics indicates the additions made by reissue.

ABSTRACT OF THE DISCLOSURE

The method of producing blister or fire refined copper from impure copper by charging the impure copper into a rotary furnace, forming a molten metal bath of the impure copper inside the furnace, rotating the furnace to create a falling film of molten metal, subjecting the falling film of molten metal to an atmosphere of substantially pure oxygen whereby the said film is oxidized, and returning the oxidized film to the bath to undergo oxygen exchange with the impurities contained therein to form a slag layer.

This invention relates to a method of producing blister copper, or fire refined copper from black copper, matte, copper and copper bearing scrap or copper alloys and is more particularly directed to a process that economically employs oxygen for oxidation of the impurities.

For many years, metallurgists have sought means for using oxygen instead of air for the oxidation of the various impurities found in metal refining. This desire was occasioned by recent strides in the oxygen industry whereby greater efficiencies in production, transportation and storage have now made the gas commercially available for large scale industrial purposes. The iron and steel industry has been the first to successfully develop new techniques looking toward[s] the reduction of production costs through the use of oxygen. To this end, processes for refining ferrous metal baths are known in which oxygen is fed by injection means that end in nozzles dipping below the surface of the metal bath. Such methods are commonly referred to as lancing. In alternate refining processes relating to the refining of pig iron and other iron alloys in furnaces, a stream of a gas rich in oxygen has been forced under pressure, through water cooled tuyeres and directed against the charge. Such methods are commonly referred to as oxygen jetting.

In the copper industry, the conversion of black copper to blister copper suitable for further refining prior to commercial use has been traditionally accomplished in a converter. Most converters as presently in use are of the horizontal, refractory lined, cylindrical type which are provided wtih a number of compressed air inlets or tuyeres along one side thereof. The vessel is motorized so that it may be rotated about its longitudinal axis. In practice, the converter is charged with molten black copper or molten matte and slag forming material. The vessel is then rotated approximately thirty degrees so that the tuyeres are under the liquid level and then compressed air is introduced. The air passes through the molten copper producing a violet agitation which requires considerable free space in the vessel above the liquid level. In addition to the size requirement, this process also has drawbacks in that the tuyeres tend to plug up and require constant opening. The impurities are either oxidized in the liquid phase and collect in the slag or are vaporized and oxidized in the vapor phase and are carried off in the exit gas stream. The volume of this exit gas stream is considerable and an extensive and expensive dust collection system is required.

Workers in the field have tried on numerous occasions to adopt some of the newer steel industry techniques for use with black copper. However, basic differences in the metals have proven that top jetting of copper is ineffective. For example, in the iron and steel industry, most effort is directed to removing carbon, a material that oxidizes readily to a gas when the bath is agitated by the oxygen jet. However, black copper contains impurities such as lead, zinc, iron, nickel, tin and sulphur which comprise at least five percent to thirty percent of the charge and, these impurities build up a great slag formation upon the surface of the bath, the very thickness of which renders top jetting completely ineffective. Lancing also has been tried, but the increased temperatures occasioned by the presence of oxygen in the bath has resulted in extremely short lance life. Accordingly, copper refining is quite dissimilar to the refining of ferrous materials inasmuch as impurities could amount to as much as thirty percent of the charge. These impurities contribute to the buildup of enormous slag concentrations at the top of the molten bath. The very thickness of the slag layer renders the usual process of top jetting to agitate the bath entirely ineffective. Further, the removal of carbon from ferrous materials proceeds efficiently when the bath is oxidized by the oxygen jet inasmuch as carbon is a material that readily oxidizes under these conditions. On the other hand, however, impure copper contains lead, zinc, iron, nickel, tin and sulphur and no carbon. The impurities of copper must therefore be treated entirely different from the impurities of iron. Techniques found successful in the iron and steel industry have not proved successful in the copper refining industry in view of the great differences in the type and characteristics of the impurities found in the respective processes.

Other workers in the field have attempted to utilize the presently available converters for use with oxygen. It has been thought that by utilizing oxygen, higher temperatures and faster reaction rates could be achieved. However, attempts to use enriched air containing more than forty percent oxygen proved impracticable as the increased temperatures of the tuyeres caused by the oxygen resulted in burnouts and refractory failures.

The instant invention has succeeded where others have failed and has proven that oxygen may be economically utilized in the copper industry. The instant process produces commercially acceptable blister copper or fire refined copper from black copper, copper scrap, copper matte or copper bearing scrap such as brass, bronze and other copper base alloys in equipment having high capacity per cubic foot of volume with substantial labor reduction and with a relatively small dust collection system required. The results are made possible by creating a falling film of molten metal in an atmosphere of substantially pure oxygen. Thus there are required no tuyeres, lances, or jets which are expensive to build and to maintain. Further, no excessive turbulence is created which could considerably reduce refractory life. The instant invention provides efficient utilization of the oxygen since it is only necessary to replace the oxygen that is consumed or that is lost by leakage. There is no attempt made to blow the slag away to impinge an oxygen stream on the clean metal surface as is done in the steel industry, inasmuch as the amount of slag build-up during the refining process is so great as to seriously hinder such action. However, by utilizing the falling film principle, oxidation rapidly progresses. The present method improves over conventional converter practice due to the use of one hundred percent oxygen. In this manner, the handling and thermal problems attendant with the presence of large quantities of nitrogen when air is utilized are entirely eliminated.

It has further been found that the instant process assures greater efficiencies and scope of operation in that it is now possible to initially utilize black copper, matte, copper scrap and alloys containing higher percentages of impurities such as lead and still produce acceptable blister copper or fire refined copper. In addition, other impurities such as nickel, arsenic and antimony can now be almost completely removed whereas prior art processes were ineffective in this respect.

It is therefore an object of this invention to produce blister copper or fire refined copper from black copper, matte, copper and copper bearing scrap or copper alloys within an enclosure maintaining an atmosphere of substantially pure oxygen.

It is another object of this invention to provide a method of producing blister copper or fire refined copper utilizing a falling film of molten metal containing substantial amounts of copper in an atmosphere of oxygen.

It is another object of this invention to provide a method of refining copper within a rotating vessel wherein low pressure oxygen may be utilized.

It is a further object of this invention to teach a method of introducing oxygen into a copper refining vessel without requiring tuyeres, lances or jets.

It is another object of this invention to produce blister copper or fire refined copper in a rotating vessel designed to receive oxygen over the melt to eliminate excessive turbulence.

It is a further object of this invention to provide an improved method of concentrating nickel in the slag of a copper refining process.

It is a further object of this invention to provide an improved method of refining copper resulting in greater impurity removal.

It is another object of this invention to provide a method of producing blister copper, or fire refined copper in a rotating vessel containing an oxygen atmosphere that requires a minimum of manual operations during the melt.

It is another object of this invention to provide a method of producing blister copper, or fire refined copper wherein the exit gas stream from the refining vessel is minimized.

It is another object of this invention to produce blister copper or fire refined copper from copper mixtures and alloys in a rotating vessel containing an oxygen atmosphere that utilizes a minimum quantity of oxygen during the melt.

It is another object of this invention to provide a process and apparatus for producing blister copper from black copper, matte, and mixtures of copper scrap or copper alloys that may be charged into a rotatable vessel in either liquid or solid state.

Other objects and a fuller understanding of the invention will be had by referring to the following description and claims of a preferred embodiment thereof, taken in conjunction with the accompanying drawing wherein like reference characters refer to similar parts throughout the several views and in which:

Figure 2:
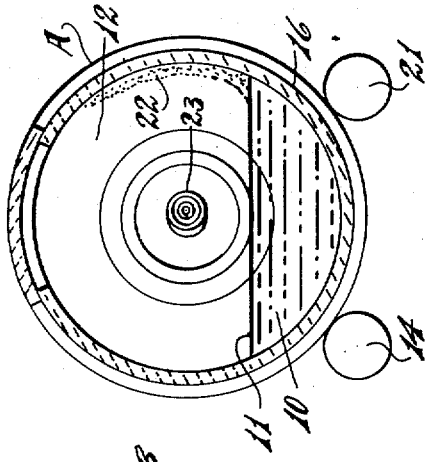
FIG. 2 is a cross sectional view taken along line 2—2 of FIG. 1 looking in the direction of the arrows.
Figure 1:
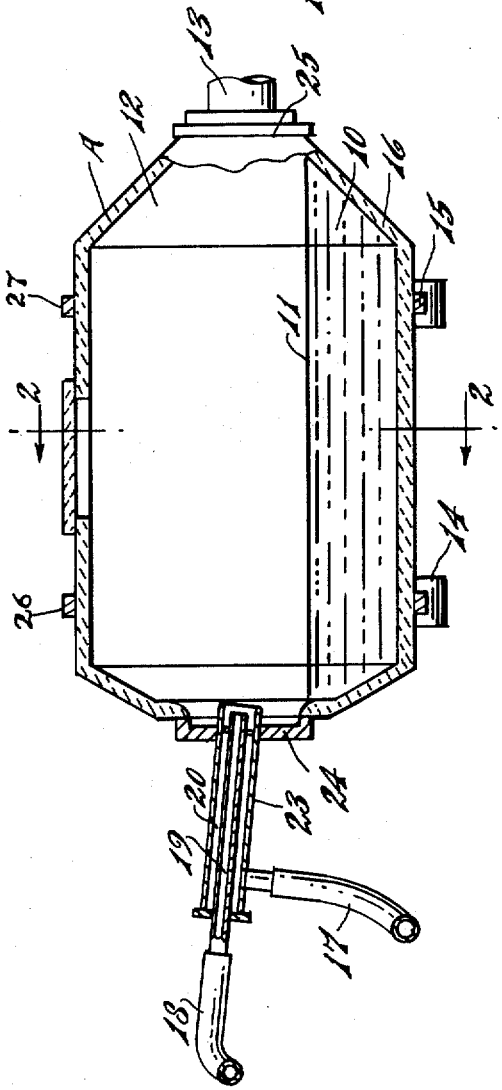
FIG. 1 is a side elevational view of a rotary furnace partially broken away to indicate the arrangement and association of the functioning portions of the apparatus.

Although specific terms are used in the following description for the sake of clarity, these terms are intended to refer only to the particular structure of our invention selected for illustration in the drawings and are not intended to define or limit the scope of the invention.

Black copper is a crude copper alloy that may be produced in a blast furnace by smelting copper bearing scrap. A typical analysis of black copper is as follows:

| | Percent |
|---|---|
| Copper | 75 |
| Lead | 4.5 |
| Zinc | 7 |
| Iron | 8 |
| Nickel | 1 |
| Tin | 1.5 |
| Sulphur | 1.5 |
| Slag, gold, silver, arsenic, antimony, etc. | 1.5 |
| | 100 |

The black copper as tapped from the blast furnace may be fed directly to a rotary furnace in liquid state or may be granulated to form one-half inch and smaller particles. The blister copper produced by the rotary furnace will vary in analysis among the producers, with a good grade containing ninety-seven percent or more metallic copper.

A quantity of black copper, in either the solid or molten state can be charged into a rotary furnace, the size of the charge being limited only by the furnace capacity. If the charge is solid, it must first be melted utilizing a concentric burner introducing a mixture of a fuel such as natural gas or propane and oxygen. As the melting begins, the furnace is rotated and a film of fluid material adheres to the refractory lining of the furnace as it emerges from the fluid bath. Once the melting process of the charge is initiated, the thermal energy produced by the oxidation reactions may be utilized within the furnace to supply the required heat to continue the melt. Once the melt has begun, careful control of the oxygen supply has resulted in the heat of reaction being so well contained that little or no supplementary fuel oil or gas need be added.

The theoretical quantity of oxygen required per ton of black copper charged into the rotary furnace may be calculated by an oxygen balance in accordance with the following table. As the efficiency of the process increases, this theoretical value can be more closely approached.

| Impurity | Weight lbs. | Lb.-moles | Oxide | Lb.-moles of $O_2$ required |
|---|---|---|---|---|
| Pb | 90 | 0.44 | PbO | 0.22 |
| Zn | 140 | 2.14 | ZnO | 1.1 |
| Fe | 160 | 2.90 | FeO | 1.5 |
| Ni | 20 | 0.34 | NiO | 0.2 |
| Sn | 30 | 0.25 | $SnO_2$ | 0.25 |
| S | 30 | 0.95 | $SO_3$ | 0.95 |
| Total theoretical oxygen required | | | | 4.20 |

Cubic feet of pure oxygen theoretically required per ton of charge:

359 cu. ft./mol×4.20 moles=1,500 cu. ft.

As the initial slag forms the slag viscosity increases, and near the end of the cycle, the oxygen is shut off and the slag is raked from the bath. Most of the iron, tin, zinc, lead and sulfur are removed in this slag, and oxygen feeding is resumed with rotation of the furnace. In this manner, oxidation of the remaining impurities continues and the purity of the copper bath may be readily ascertained by taking samples until the furnace is ready to be tapped.

Referring now to the drawings we show a rotating furnace generally designated A equipped with a pair of circumferential riding rings 26, 27 which are carried by rollers 14, 21 and driving roller 15 to permit rotation about its longitudinal axis in the usual manner. A hinged door 24 closes one end of the furnace to permit charging and slaging operations to proceed and the door removably carries a concentric burner 23. A refractory lining 16 protects the furnace shell from the heat of the molten bath 10 and carries a portion 22 of the bath 10 entrained thereon above the slag surface 11 as the furnace rotates in a counter-clockwise direction.

The combination burner oxygen inlet tube 23 is of the concentric type with an oxygen supply 18 directed through the central passage 19 and the fuel supply 17 passing through the outer gas passage 20. The inlet tube may be water cooled if desired. The burner inclined downwardly towards the slag surface 11 and is laterally deflected to direct its stream to impinge upon the rising film 22 as it rises above the slag during rotation to supply pure oxygen directly to the most critical location. The furnace terminates rearwardly in an aligned head 25 which supports the exhaust duct 13 provided to carry the products of combustion to a conventional fume collection system (not shown) in the usual manner.

The instant process is carried on at an operating temperature of approximately 2600° F. and may best be described as a falling film reaction in an oxygen atmosphere. The rotating vessel A succeeds in having a portion of the fluid bath adhere to the refractory 16 to establish a falling film 22 of liquid in an oxygen atmosphere 12 within the vessel. The exposed copper quickly oxidizes and drops back into the bath where further oxygen exchange occurs. Reactions similar to the following occur in the bath:

$$Cu_2O + Fe \rightarrow FeO + 2Cu$$

The oxides of iron, lead, tin, etc., rise in the bath to form the slag.

As an example of the process, one ton of black copper in its solid state was charged into a rotary furnace and the burner was fired at a rate of 3,500 cubic feet per hour of natural gas with 6,800 cubic feet per hour of oxygen. After a period of between eleven and twelve minutes, both liquid and solid phases exist in the charge. At that time, as was predetermined by trial, the fuel was shut off and the oxygen flow was increased to 8,000 cubic feet per hour and this condition was maintained for a period of twenty minutes.

Figure 3:
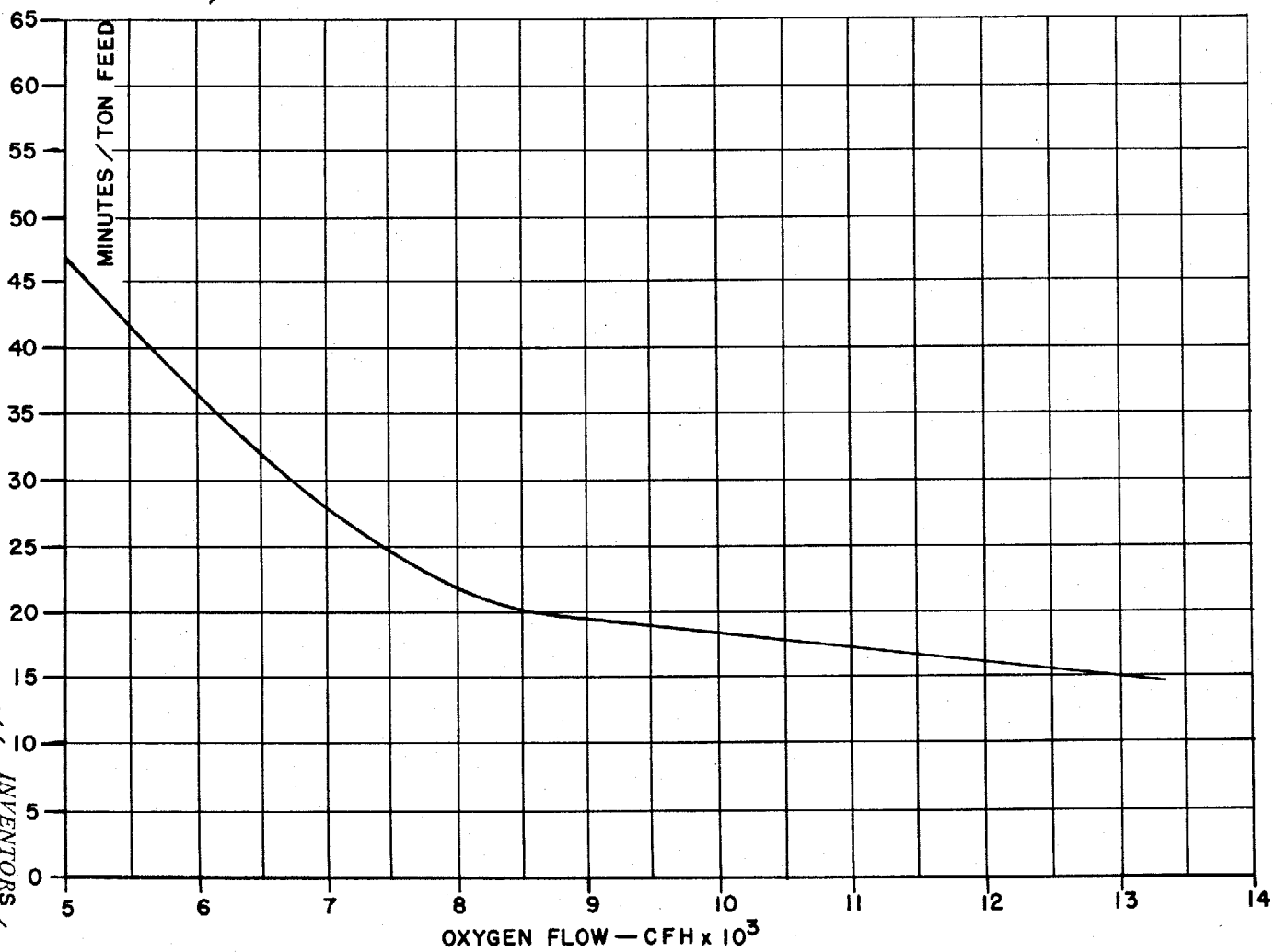
FIG. 3 is a graph illustrating the functional relationship between the refining time in minutes per ton of material fed into the furnace and the quantity of oxygen supplied as expressed in terms of cubic feet per hours.

An oxygen flow rate of 8,000 cubic feet per hour was selected as the rate which would complete the refining process in the optimum time as illustrated in FIG. 3. Higher flow rates would complete the refining in a shorter time. However, as shown in the curve of FIG. 3, increased flows do not substantially reduce the refining time and so cannot be economically justified. In addition, trial runs have substantiated that oxygen flow rates above 10,000 cubic feet per hour cause foaming of the bath with resultant interruption of the process. As previously indicated, melting is not complete at the beginning of the refining phase and the oxidation of the impurities in the bath provides the heat required to sustain bath temperatures. Slag formation proceeds simultaneously with the overall effect of refining the copper.

Tests have been conducted to determine the optimum mixture of oxygen and air for most efficient processing.

The total oxygen flow was maintained relatively constant; however, the total gas flow was progressively increased.

A summary of the significant test results is set forth below:

| Test No. | Pure oxygen, c.f.h. | Air, c.f.h. | Refining time, minutes | Cubic feet of pure oxygen per ton charged |
|---|---|---|---|---|
| 1 | 7,800 | 0 | 70 | 4,500 |
| 2 | 6,800 | 4,760 | 72 | 4,280 |
| 3 | 5,800 | 9,520 | 87 | 4,010 |

Based upon thermodynamic considerations, a significant increase in thermal efficiency will be achieved by using an enriched oxygen atmosphere within the rotary furnace. Further, an increase in the reaction temperature is achieved as well as a decrease in the quantity of exhaust gases.

Within a falling film reactor enclosing an oxygen atmosphere, the following may be assumed to occur:

(1) Diffusion of oxygen molecules in the gas phase to the liquid film surface. When pure oxygen is used, the gas phase resistance to mass transfer is eliminated.

(2) Adsorption of oxygen atoms on the liquid film surface, the resistance being considered negligible.

(3) Steady diffusion of oxygen atoms into the liquid film plus oxidation of the molten metals.

(4) Reduction of copper oxide and oxidation of the impurities in the bulk liquid phase.

(5) Formation and segregation of the slag.

Additional tests have been conducted to determine the effect of the gas-phase oxygen concentration on temperature, heat, time and rate of impurity removal. The total gas flow rate was kept constant while varying the oxygen concentration. In each test, approximately 2,600 pounds of black copper was charged into a rotary furnace and a total gas input flow rate of 7,800 c.f.h. was utilized.

The total gas input and oxygen concentrations for each test are listed below:

| Test No. | Pure oxygen (s.c.f.h.) | Air | | Total gas volume (s.c.f.h.) | Percent oxygen | Percent nitrogen |
|---|---|---|---|---|---|---|
| | | Oxygen (s.c.f.h.) | Nitrogen (s.c.f.h.) | | | |
| 4 | 7,800 | 0 | 0 | 7,800 | 100.0 | 0.0 |
| 5 | 5,750 | 430 | 1,620 | 7,800 | 79.2 | 20.8 |
| 6 | 3,800 | 840 | 3,160 | 7,800 | 59.5 | 40.5 |

Starting with black copper having the following chemical composition:

| | |
|---|---|
| Cu | 76.3 |
| Sn | 2.18 |
| Pb | 3.61 |
| Fe | 5.85 |
| Ni | 1.88 |
| Zn | 5.51 |
| S | 2.84 |
| Si | 1.1 |
| $H_2O$ | .45 |
| Others | .28 |
| Total | 100.0 |

The following test results were noted:

| Test No. | Sample No. | Refining time (min.) | Temp. (° F.) | Percent of elements present | | | | | | |
|---|---|---|---|---|---|---|---|---|---|---|
| | | | | Cu | Pb | Ni | Sn | S | Fe | Zn |
| 4 | 1 | 20 | 2,520 | 88.97 | 4.68 | 1.90 | 1.98 | .95 | .85 | .62 |
| | 2 | 40 | 2,440 | 94.81 | 1.80 | 1.17 | .24 | .51 | .22 | .10 |
| | 3 | 60 | 2,350 | 98.40 | .45 | .37 | .10 | .03 | .01 | .10 |
| 5 | 1 | 20 | 2,420 | 89.13 | 4.46 | 1.95 | 2.07 | .84 | .58 | .85 |
| | 2 | 40 | 2,405 | 95.01 | 2.37 | 1.24 | .36 | .50 | .05 | .10 |
| | 3 | 60 | 2,280 | 97.33 | 1.24 | .35 | .10 | .03 | .01 | .10 |
| | 4 | 72 | ---------- | 98.38 | 1.32 | .31 | .10 | .03 | .04 | .10 |
| 6 | 1 | 20 | 2,400 | 86.32 | 5.09 | 1.32 | 2.76 | .84 | .43 | 2.50 |
| | 2 | 40 | 2,350 | 90.61 | 4.33 | 1.70 | 1.64 | .92 | .43 | .23 |
| | 3 | 60 | 2,390 | 93.10 | 3.06 | 1.27 | .58 | 1.16 | .10 | .15 |
| | 4 | 75 | 2,450 | 94.50 | 1.99 | 1.31 | .15 | 1.00 | .06 | .15 |
| | 5 | 93 | 2,330 | 95.88 | 1.06 | 1.05 | .15 | 1.01 | .05 | .15 |
| | 6 | 115 | ---------- | 97.15 | .80 | 1.00 | .10 | .51 | .03 | .10 |

Figure 4:
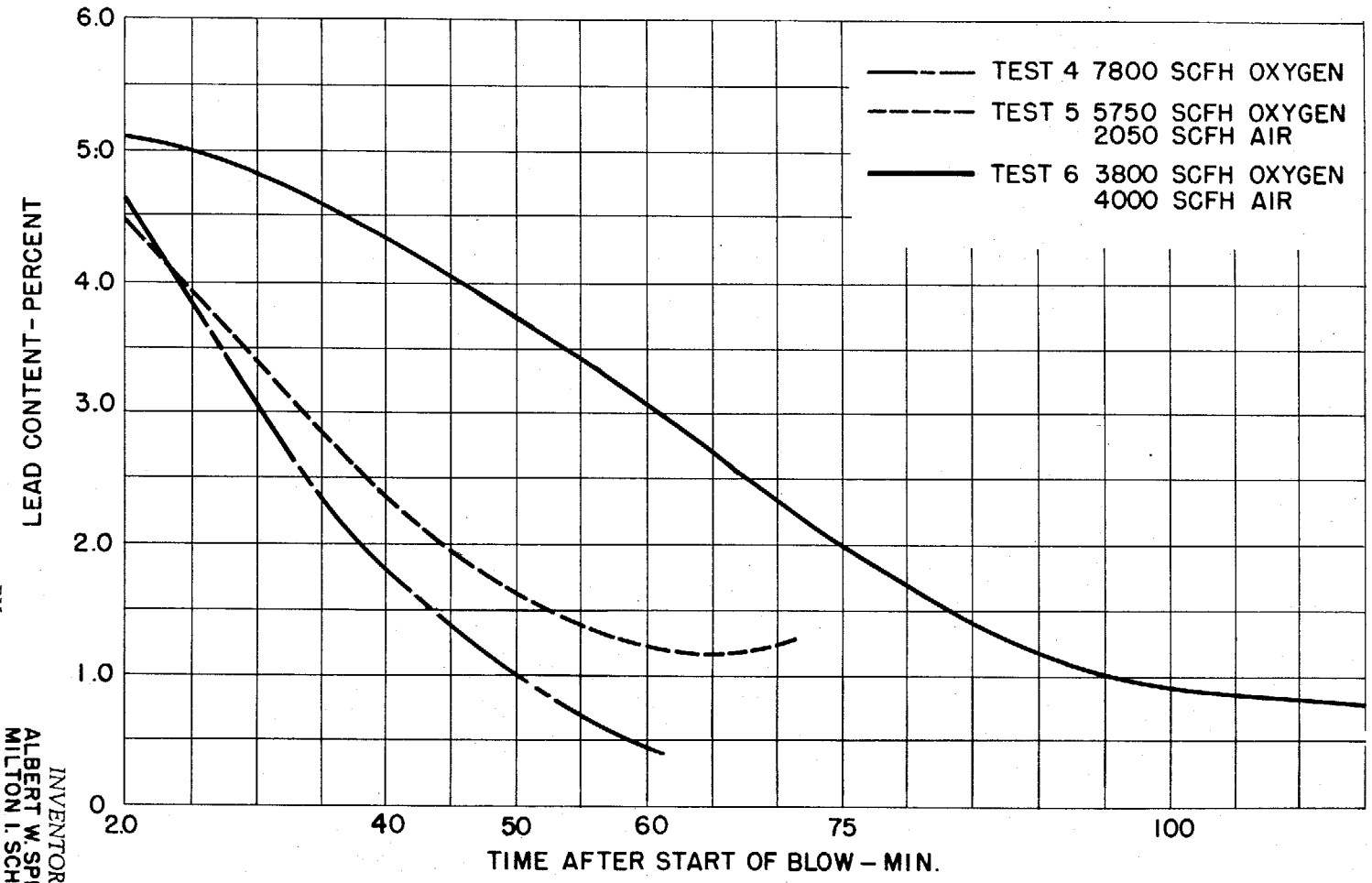
FIG. 4 is a graph illustrating the variation of lead impurity concentration with blowing time at different oxygen enrichment levels.

It should be noted that only test Number 4 wherein one hundred percent oxygen was employed produced blister copper having the lead content reduced to an acceptable amount. The variation of lead impurity at different oxygen enrichment levels is graphically demonstrated in FIG. 4.

A further unique advantage of this process may be observed when using black copper from the blast furnace or other copper bearing metals that are low in sulfur content. Once the melt has begun and the fuel supply has been shut off the need for draft in order to continue the reaction is substantially eliminated since all of the oxides of the impurities normally found are solids at operating temperatures. A minimum of gaseous products will therefore be produced and no extensive fume system is thus required. In such a manner, the process economically provides maximum oxygen utilization inasmuch as once the draft is closed, the only oxygen flow required will be make up for the oxygen used by the slag forming impurities.

Conventional converters as presently employed under average conditions can eliminate some impurities almost entirely, while other impurities cannot be oxidized to any great degree. The following table sets forth the average elimination of impurity in converting when utilizing presently available equipment.

| Element: | Percent elimination |
|---|---|
| S | 99 |
| Fe | 99 |
| Zn | 99 |
| Co | 99 |
| Bi | 97 |
| Pb | 96 |
| As | 81 |
| Sb | 71 |
| Se | 47 |
| Te | 40 |
| Ni | 37 |

The instant process removes impurities with much greater efficiencies and achieves results never before attainable with previously available equipment. Now, arsenic, antimony, selenium and tellurium can be oxidized in the falling film reactor whereas under prior operating conditions, these elements had to be removed by the electrolytic refining process. Further, nickel oxidation can now be so complete as to result in a significant nickel recovery in the slag.

The motor and gear arrangement (not shown) powering the drive roller 15 preferably incorporates speed varying facilities in any well known manner to permit the rate of rotation of the vessel to be modified as desired, depending on the chemical composition of the charge. Generally, it has been found, that faster vessel rotation will result in an increased rate of reaction until the peak rotational speed efficiency point has been reached. By increasing the speed of rotation of the vessel, the reaction time can be decreased and greater efficiencies realized. The added revolutions of the rotary vessel will produce more molten metal surface area to become exposed to the oxygen atmosphere. Further, the increased rotational speed will increase the turbidity of the bath, will produce a thinner falling film clinging to the refractory lining and thus be more efficient in the removal of impurities.

By utilizing an oxygen atmosphere within a rotating vessel, oxygen tends to impregnate the voids and cling to the refractory lining. After the melt has begun and a falling film of metal has been provided as hereinbefore described, it can be appreciated that the reaction rate increases from the oxidation of both the surface of the film exposed to the interior oxygen atmosphere and the surface in contact with the refractory lining. A film of oxygen is thus established between the vessel lining and the metal film itself, thereby causing simultaneous oxidation reactions to occur.

It is thus seen that the process described provides great economic advantages over heretofore used methods in that the oxygen atmosphere permits refining in the fastest possible time to give maximum production capacity. In such a manner, the capital requirements for equipment may be kept at a minimum.

Similarly, the described process may readily be adapted for upgrading almost pure copper scrap to fire refined copper by utilizing the same falling film principle in an oxygen atmosphere.

Although we have described our invention with a certain degree of particularity, it is understood that the present disclosure has been made only by way of example and that numerous changes in parts may be resorted to without departing from the spirit and scope of the invention as hereinafter claimed.

What is claimed is:

1. The method of refining black copper, copper scrap, copper alloys and copper bearing mixtures containing impurities to blister copper or fire refined copper comprising the steps of charging a quantity of impure copper into a horizontal rotary furnace through an opening therein, closing the said opening and placing a burner therein in communication with the furnace interior above the level of the said charged materials; introducing oxygen and fuel into the furnace interior through respective channels in the burner for a predetermined period of time the said oxygen being directed above the surface of charged materials; rotating the furnace and utilizing the heat of the oxidized fuel to melt the charge into a molten bath; stopping the fuel supply and increasing the oxygen flow after said predetermined period to provide an oxygen atmosphere above the molten bath for a period of forty to sixty minutes; creating a film of molten metal adhering to the sides of the rotating furnace as the sides rise above the said bath; oxidizing the said film to oxidize the metal and returning the oxidized material to the bath; effecting oxygen exchange between the said oxidized metal and the impurities in the bath; and forming a slag of oxidized impurities above a refined copper bath.

2. The method of claim 1 wherein the said predetermined period of time for supplying fuel is less than twelve minutes.

3. The method of claim 1 wherein the oxygen flow supplied following the said predetermined period is less than 6,000 cubic feet per hour per ton of impure copper charged.

4. The method of claim 1 wherein fuel is supplied for a period of time to melt sufficient quantities of the charge to enable the heat of the oxidation reactions to complete the melt.

5. The method of claim 1 wherein the oxygen flow is maintained for a period of time until the refined copper contains less than 2% impurities.

6. The method of claim 1 wherein the refined copper contains less than 0.8% lead as an impurity.

7. The method of refining impurity containing copper to blister copper or fire refined copper comprising the steps of charging a quantity of impure copper into a rotary furnace; introducing oxygen into the furnace above the surface of the said charge for a period of from forty to sixty minutes to provide a one hundred percent oxygen atmosphere within the furnace; forming a molten bath of impurity containing copper within the furnace; rotating the furnace about a horizontal axis and agitating the bath; producing a falling film of molten metal in contact with interior walls of the furnace as they rise above the said bath during rotation; oxidizing the exposed surface of the said film to metallic oxides; and reacting the metallic oxides with the impurities entrained in the charge to produce slag forming oxides of impurities.

8. The method of claim 7 wherein the said charged material is molten.

9. The method of claim 7 wherein the said charged material is solid and wherein a fuel-oxygen mixture is introduced into the furnace above the charge.

10. The method of claim 7 wherein the said charged material is solid and wherein a fuel-oxygen mixture is introduced into the furnace above the charge while rotating the said furnace about its horizontal axis.

11. The method of claim 7 wherein the said charged material is solid and wherein a fuel-oxygen mixture is introduced into the furnace above the charge for a predetermined period of time to begin to melt the charge.

12. The method of claim 7 wherein the said charged material is solid and wherein a fuel-oxygen mixture is introduced into the furnace above the charge for a period of approximately twelve minutes, then stopping the gas flow and utilizing the heat generated by the oxidation reactions to complete melting the charge to a molten bath.

13. The method of claim 7 wherein the said charged material is solid and wherein a fuel-oxygen mixture is introduced into the furnace above the charge for a period of approximately twelve minutes, then stopping the gas flow and utilizing the heat generated by the oxidation reactions to complete melting the charge to a molten bath and wherein the quantity of oxygen supplied after the fuel blowing operation approaches its theoretical requirement for complete oxidation of the impurities.

14. The method of claim 7 wherein the said charged material is solid and wherein a fuel-oxygen mixture is introduced into the furnace above the charge for a period of approximately twelve minutes, then stopping the gas flow and utilizing the heat generated by the oxidation reactions to complete melting the charge to a molten bath and wherein the quantity of oxygen supplied after the fuel blowing operation does not exceed three times its theoretical requirement for complete oxidation of the impurities.

15. The method of refining black copper, copper scrap, matte, copper alloys and copper bearing mixture to blister copper or fire refined copper comprising the steps of forming a molten bath of the said impurity containing copper within a rotary vessel, directing a stream of substantially pure oxygen into the said furnace to provide an oxygen atmosphere therein above the said bath, said oxygen stream being directed into the furnace interior through a path designed to avoid bottom blowing or sidewall blowing of the oxygen through the bath; rotating the furnace during the refining process to agitate the bath to a nonpneumatic turbulence, said rotation being maintained during the entire refining period, said agitation promoting efficient gas-liquid-solid contact and uniform and rapid distribution of the oxygen throughout the bath, said rotation creating a falling film of metal as the rotating sides rise above the bath and carry an adhering film of molten metal into the oxygen atomsphere above the bath; increasing the rate of reaction by returning the said oxidized film into the bath, said oxidized film materials reacting with the impurities in the bath to produce slag forming oxides of impurities; maintaining the bath temperature at at least 2300° F.; and maintaining the oxygen flow for a period approximately sixty minutes while continuing the rotation to produce copper with a lead content of not more than .45% and a nickel content of not more than .37%.

16. The method of claim 15 wherein the charge is initially in solid form and wherein the melt is begun by utilizing a fuel-oxygen mixture above the charge for a period of approximately twelve minutes.

17. The method of claim 15 wherein more than 90% of impurities such as arsenic, antimony, selenium and tellurium are removed.

18. The method of refining black copper, copper scrap, matte, copper alloys and copper bearing mixture to blister copper or fire refined copper comprising the steps of forming a molten bath of the said impurity containing copper within a rotary vessel, directing a stream of substantially pure oxygen into the said furnace to provide an oxygen atmosphere therein above the said bath, said oxygen stream being directed into the furnace interior through a path designed to avoid bottom blowing or sidewall blowing of the oxygen through the bath; rotating the furnace during the refining process to agitate the bath to a non-pneumatic turbulence, said rotation being maintained during the entire refining period, said agitation promoting efficient gas-liquid-solid contact and uniform and rapid distribution of the oxygen throughout the bath, said rotation creating a falling film of metal as the rotating sides rise above the bath and carry an adhering film of molten metal into the oxygen atmosphere above the bath; increasing the rate of reaction by returning the said oxidized film into the bath, said oxidized film materials reacting with the impurities in the bath to produce a slag forming oxides of impurities; maintaining the bath temperature at at least 2300° F.; and maintaining the oxygen flow for a period approximately of from forty to sixty minutes while continuing the rotation to produce copper with a lead content of not more than .45% and a nickel content of not more than .37%.

19. The method of refining impure copper to blister copper, which method comprises:

(A) introducing oxygen at a flow rate less than 10,000 cubic feet per hour *per ton* into a rotary furnace containing a molten metal bath of impure copper to provide an oxygen atmosphere inside the furnace above said bath, (1) the said oxygen being directed above the said molten metal bath;

(B) rotating the said furnace to provide a falling film of molten metal from the metal adhering to the internal walls of the furnace which rise above the molten metal bath as the furnace rotates;

(C) oxidizing the falling film of molten metal with the oxygen atmosphere which is inside the furnace above the molten metal bath whereupon the oxidized film returns to the bath, an oxygen exchange occurs between the oxidized molten metal and the impurities present in that bath, and a slag layer is formed upon the surface of the said molten metal bath;

(D) recovering blister copper by removing the said slag layer formed on the molten metal bath by the reaction of the oxidized molten metal with impurities present in that bath.

*20. The method of converting impure copper-bearing material into blister copper, which comprises:*

*(a) confining the impure copper-bearing material in a reactor which provides a substantially closed environment,*

*(b) forming a melt of the impure copper-bearing material within the reactor,*

*(c) introducing substantially pure oxygen into the reactor environment above the melt of the impure copper-bearing material, and*

*(d) lifting a film of copper-bearing material above the level of the melt and letting it fall back into the melt thereby effecting intimate contact of the copper-bearing material and oxygen whereby oxidation of the copper is effected and the resulting copper oxide in turn transfers oxygen to the more readily oxidizable impurities in the melt and reduces the copper oxide to copper.*

*21. The method defined in claim 20 in which copper oxide is reduced to copper at a rate controlled by the rate at which the copper-bearing material is lifted above the level of the melt and let fall back into the melt.*

*22. The method of claim 20 in which prior to the complete reduction of copper oxide to copper the introduction of substantially pure oxygen into the reactor is discontinued and impurities are removed from the melt prior to again introducing oxygen into the reactor.*

*23. The method of claim 20 in which the reactor is a*

*refractory-lined elongated vessel of circular transfer section with its longitudinal axis extending in a generally horizontal direction, said reactor being rotated about its longitudinal axis such that impure copper-bearing material is lifted by the formation of a film on the refractory wall, which film is carried above the melt before falling onto the surface of the melt.*

*24. The method defined in claim 23 in which the reactor is rotated about its longitudinal axis continuously in one direction.*

*25. The method of producing blister or fire-refined copper from impure, copper, which method comprises:*

*charging the impure copper into a rotary furnace,*

*forming a molten metal bath of the impure copper inside the furnace,*

*rotating the furnace to create a falling film of molten metal,*

*subjecting the falling film of molten metal to an atmosphere of substantially pure oxygen whereby the said film is oxidized, and*

*returning the resulting oxidized film to the molten metal bath to undergo oxygen exchange with impurities contained in said bath.*

*26. The method of refining black copper, copper scrap, copper alloys or copper-bearing mixtures containing impurities to blister copper or fire-refined copper, which method comprises the steps of:*

*(a) charging a quantity of impure copper into a rotary furnace;*

*(b) introducing oxygen and fuel into the furnace interior above the surface of the charged impure copper to convert the impure copper into a molten metal bath;*

*(c) terminating the supply of fuel into the interior of the furnace while continuing the introduction of substantially pure oxygen;*

*(d) creating a film of molten metal adhering to the periphery of the interior of the furnace by rotation of the furnace;*

*(e) oxidizing the film of molten metal and returning the resulting oxidized metal to the molten metal bath; and*

*(f) effecting oxygen exchange between said oxidized metal and impurities in the molten metal bath.*

*27. The method of refining impurity-containing copper to blister copper or fire-refined copper, which method comprises the steps of:*

*charging a quantity of impurity-containing copper into a rotary furnace;*

*introducing oxygen into the rotary furnace above the surface of the charge;*

*rotating said furnace, thereby producing a falling film of metal from the metal adhering to the interior surface of the furnace during rotation;*

*oxidizing the falling film of metal; and*

*returning the resulting oxidized film to the molten metal bath to undergo oxygen exchange with impurities contained in said bath.*

References Cited

The following references, cited by the Examiner, are of record in the patented file of this patent or the original patent.

UNITED STATES PATENTS

| | | | |
|---|---|---|---|
| 1,352,912 | 9/1920 | Partridge | 75—76 X |
| 3,057,616 | 10/1962 | Wohlfahrt et al. | 75—60 X |
| 3,098,739 | 7/1963 | Graef et al. | 75—60 X |
| 3,099,553 | 7/1963 | Aamot | 75—72 X |
| 3,256,060 | 6/1966 | Globus | 75—82 X |
| 3,258,330 | 6/1966 | Ito | 75—75 |
| 3,326,672 | 6/1967 | Worner | 75—75 X |
| 3,423,202 | 1/1969 | Ledune et al. | 75—60 |

L. DEWAYNE RUTLEDGE, Primary Examiner

J. E. LEGRU, Assistant Examiner

U.S. Cl. X.R.

75—76